Aug. 3, 1954  H. RICH  2,685,675

SYNCHROSCOPE CIRCUIT

Filed Aug. 9, 1952

Inventor:
Harold Rich,
by Russell A. Warner
His Attorney.

Patented Aug. 3, 1954

2,685,675

UNITED STATES PATENT OFFICE 2,685,675

SYNCHROSCOPE CIRCUIT

Harold Rich, Lynn, Mass., assignor to General Electric Company, a corporation of New York Application August 9, 1952, Serial No. 303,631

5 Claims. (Cl. 324—90)

My invention relates to synchroscope circuits, and its object is to provide means for preventing an erroneous synchroscope indication in case one of the energizing circuits to the synchroscope should accidentally open. When one of the circuits of a synchroscope opens, the pointer of the synchroscope comes to rest and this may be at any point of the scale. An operator not realizing that one of the circuits is open, might think that a condition of synchronism exists and throw his incoming machine on the line with disastrous results. The present invention is intended to prevent a mistake of this character.

The features of my invention which are believed to be novel and patentable will be pointed out in the claims appended hereto. For a better understanding of my invention, reference is made in the following description to the accompanying drawing in which Fig. 1 represents a preferred embodiment of my invention, employing phase shifting condensers between the incoming and running circuit connections of the synchroscope, and Fig. 2 represents a modification where the condensers of Fig. 1 are replaced by reactors.

Figure 1:
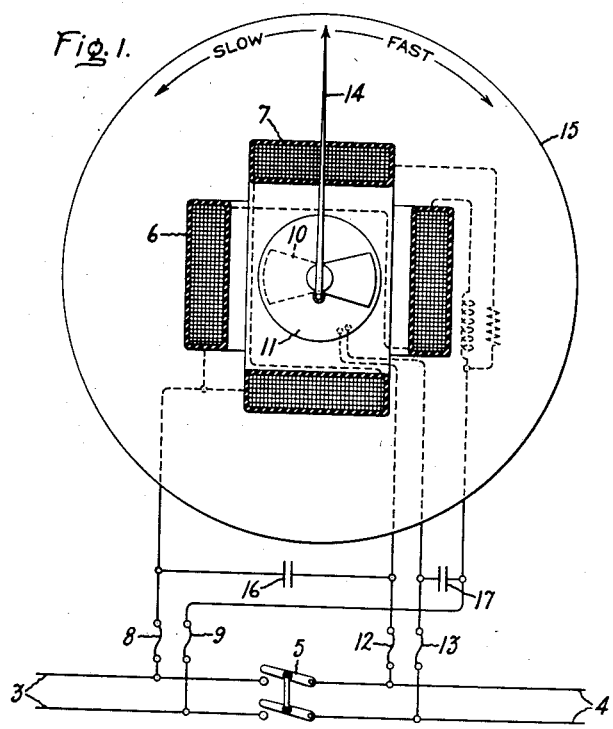
Figure 2:
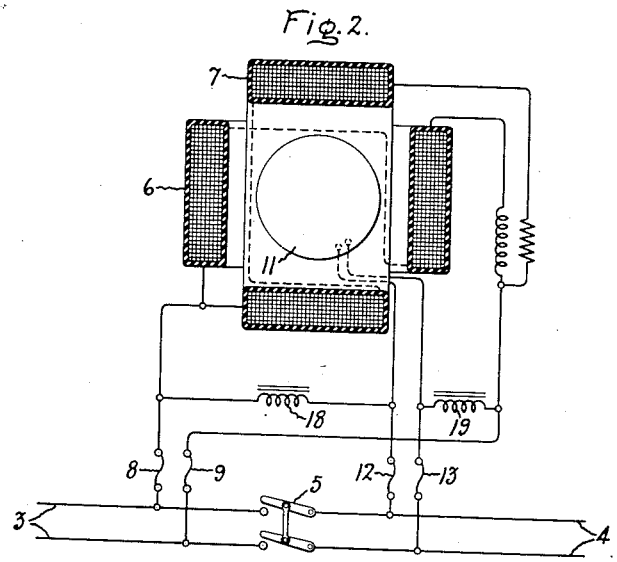

Referring now to Fig. 1, 3 and 4 represent alternating current power lines to be connected by a switch 5 when the voltage and frequency of such lines are similar and the voltages are in phase. A synchroscope is provided to indicate when a synchronizing condition exists. The synchroscope is of a usual type having a stationary split phase field winding comprising coils 6 and 7 connected across line 3 through fuses 8 and 9, and a two-pole rotor 10 energized by a stationary winding comprising axial coil 11 connected across line 4 through fuses 12 and 13. The two-pole rotor magnetic shaft passes through coil 11 and is provided with the pointer 14 indicating on a synchroscope scale 15. The rotor poles are 180 degrees apart and located at opposite ends of coil 11.

The coils 6 and 7 produce a rotating magnetic field of the polarity and frequency of line 3. The rotor poles reverse in polarity at a frequency and in phase with the voltage of line 4. When there is a small difference in frequency of the two circuits 3 and 4, the rotor 10 of the synchroscope will rotate at a speed corresponding to the difference in frequency and in a direction indicative of which frequency is low. When the frequencies are the same, the rotor will be stationary and take a position corresponding to the phase relation between the two power circuits. The pointer 14 is provided to indicate such relationship on scale 15.

The instrument is calibrated with respect to the line connections to indicate the phase angular relation of one line, such as 4 called the incoming circuit, with respect to the other line 3, called the running circuit. The pointer is adjusted on its shaft so that it points directly up when the incoming and running circuit voltages are in phase. If the pointer rotates in a clockwise direction, it indicates that the incoming line frequency is correspondingly fast. When the pointer movement is very slow or is stationary and is passing through or is in the upright position, the line switch 5 may be closed, etc.

Now it may happen that one of the circuits of the instrument may accidentally become deenergized during a synchronizing operation as, for example, by the blowing of one or more of the fuses 8, 9, 12, or 13. When this happens the ordinary instrument loses its torque and the pointer comes to rest, and should it come to rest in the upright position, the operator, not knowing of the deenergized condition, would ordinarily close the switch 5. There is a good chance that this will cause disastrous results, such as injury to the incoming machine, the blowing of circuit breakers, interruption of service, and the like. It is evident that a situation such as assumed is worse than having no synchroscope at all. According to my invention I provide phase shifting impedances represented by condensers 16 and 17 between each instrument energizing circuit and the line to which the circuit is not ordinarily connected, so that should the normal energizing circuit open accidentally, the corresponding energizing winding of the instrument, nevertheless, is energized but in a phase relation that will cause the instrument to indicate a nonsynchronizing condition.

For example, let us assume that one or both of the fuses 12 or 13 blows. Coil 11 will no longer be energized from line 4. It will, however, receive energy from line 3 through condensers 16 and 17. Now both instrument circuits are energized from line 3 in a fixed phase relation, but due to the shift in phase caused by condensers 16 and 17 through which winding 11 is energized, the instrument cannot indicate a condition of synchronism, but rather, a substantially out-of-phase condition. That is, pointer 14 comes to rest in a non-upright position, and thus warns the operator not to close switch 5, since in normal operation of the synchroscope switch 5 is closed when pointer 14 is upright. Due to the voltage drop across the condensers, they exercise no control under normal conditions. That is, the normal energizing voltage of coil 11 from line 4 during a synchronizing operation is sufficiently higher than that which can be fed through the condensers from line 3 that the condensers will have no effect, but the condensers will take over control in case the normal energizing circuit to coil 11 is interrupted as at one or both of the fuses 12 or 13, and the instrument will develop enough torque to indicate the fixed out-of-phase relation of the energizing voltages applied to the two energizing circuits.

In the above example it was assumed that the normal energizing circuit of coil 11 was interrupted. The safety feature operates just as well in case the normal energizing circuit of the winding comprising coils 6 and 7 is opened as at fuses 8 or 9. In this case these coils become energized from line 4 through the condensers 16 and 17, which shifts the phase on the circuit of coils 6 and 7 from the voltage on coil 11 and results in a nonsynchronizing indication in the opposite direction.

In place of condensers I may use phase shifting reactors as represented at 18 and 19 in Fig. 2. In case reactors are used the shift in phase caused thereby is in the opposite direction to that caused by condensers, but the result is to produce a nonsynchronizing indication when a fuse to one of the energizing circuits to the synchroscope blows or the energizing circuit is otherwise interrupted.

So far as the safety feature is concerned, it is obviously immaterial which lead of one instrument winding is connected to a given lead of the instrument winding through a given condenser, or other phase shifting device. Thus, in Fig. 1, the connections from condensers 16 and 17 to the leads to winding 11 could just as well be reversed. The effect of this would be to shift the phase on the winding energized through the condensers by 180 degrees, which will produce a substantially out-of-phase indication, but in a direction opposite to that for the connections shown. There is, however, some slight preference for the connections as shown because when the switch 5 is closed during a synchronizing operation, the condensers as connected become short circuited and consequently draw no further current in case the synchroscope is left connected to the lines 3 and 4.

The cost for the added safety afforded by the invention is small, the condensers being somewhat less expensive than the reactors.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A synchroscope instrument having a first winding adapted to be connected to one source of alternating current supply for producing a rotating magnetic field and a second winding adapted to be connected to a second source of alternating current supply for producing an alternating magnetizing field for an associated iron member, said instrument being designed to indicate the phase relation between such sources of supply, and phase shifting impedance means connected between the terminals of one winding and the terminals of the other winding, said impedance means having a magnitude of impedance whereby electrical energy transferred to said windings through said impedance means is relatively low compared with electrical energy furnished directly by said alternating current sources and the normal operation of said synchroscope is substantially uneffected by said impedance means, said energy transferred through said impedance means being sufficient to operate said synchroscope from one of said sources in the event of de-energization of the other of said sources.

2. A synchroscope having a pair of energizing windings each having a pair of energizing leads adapted to be connected to different sources of alternating current one of said windings producing a rotating magnetic field and the other of said windings producing an alternating magnetizing field for an associated iron member, said synchroscope being designed, when so connected, to indicate the phase relation between said sources, and a pair of condensers connected between the leads of one winding and the leads of the other winding, said condensers having a magnitude of capacitance whereby electrical energy transferred to said windings through said condensers is relatively low compared with electrical energy furnished directly by said alternating current sources and the normal operation of said synchroscope is substantially unaffected by said condensers, said energy transferred through said condensers being sufficient to operate said synchroscope from one of said sources in the event of de-energization of the other of said sources.

3. A synchroscope having two windings, connections for connecting one winding to one source of alternating current supply, connections for connecting the other winding to another source of alternating current supply one of said windings producing a rotating magnetic field and the other of said windings producing an alternating magnetizing field for an associated iron member, said synchroscope being designed to indicate the phase relation between such sources when so connected, and means for causing said synchroscope to produce an out-of-phase indication in case the connection to one of said sources fails, comprising connections between said windings including phase shifting means whereby said windings may be energized in parallel by out-of-phase voltages from the other source of supply, said phase shifting means having a magnitude of impedance whereby electrical energy transferred to said windings through said phase shifting means is relatively low compared with electrical energy furnished directly by said alternating current sources and the normal operation of said synchroscope is substantially unaffected by said phase shifting means.

4. A synchroscope having a pair of energizing windings each having a pair of energizing leads adapted to be connected to different sources of alternating current one of said windings producing a rotating magnetic field and the other of said windings producing an alternating magnetizing field for an associated iron member, said synchroscope being designed, when so connected, to indicate the phase relation between said sources, and a pair of reactors connected between the leads of one winding and the leads of the other winding, said reactors having a magnitude of reactance whereby electrical energy transferred to said windings through said reactors is relatively low compared with electrical energy furnished directly by said alternating current sources and the normal operation of said synchroscope is substantially unaffected by said reactors, said energy transferred through said reactors being sufficient to operate said synchroscope from one of said sources in the event of de-energization of the other of said sources 5. A synchroscope for indicating frequency and phase synchronism of two alternating current electric systems, comprising field windings, first fuse means, said field windings being connected to one of the alternating current systems through said first fuse means and providing a rotating magnetic field, a rotor member located within said rotating field, an energizing winding for said rotor member, second fuse means, said energizing winding being connected to the other of the alternating current systems through said second fuse means, whereby said rotor member tends to rotate at a speed proportional to the frequency difference between said systems and to assume an angular position related to the phase difference between said systems, said rotor member being substantially stationary in an upright position when said two systems are synchronized as to frequency and phase, and two condensers each connected between said field windings and said energizing winding, whereby upon failure of either of said fuse means disconnecting one of said systems all of said windings are energized from the other of said systems and said rotor member assumes a stationary non-upright position, said condensers having a magnitude of capacitance whereby electrical energy transferred to said windings through said condensers is relatively low compared with electrical energy furnished directly by said alternating current sources and the normal operation of said synchroscope is substantially unaffected.

References Cited in the file of this patent

UNITED STATES PATENTS

| Number | Name | Date |
|---|---|---|
| 685,155 | Lincoln | Oct. 22, 1901 |
| 2,532,435 | Allen | Dec. 5, 1950 |